(12) United States Patent
Ahire

(10) Patent No.: US 11,507,906 B2
(45) Date of Patent: Nov. 22, 2022

(54) RIDE-SHARING SAFETY SYSTEM

(71) Applicant: Toyota Motor North America, Inc., Plano, TX (US)

(72) Inventor: Sachin J. Ahire, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 297 days.

(21) Appl. No.: 16/548,649

(22) Filed: Aug. 22, 2019

(65) Prior Publication Data

US 2021/0056477 A1 Feb. 25, 2021

(51) Int. Cl.
*G06Q 10/06* (2012.01)
*G01C 21/34* (2006.01)

(52) U.S. Cl.
CPC ..... *G06Q 10/0635* (2013.01); *G01C 21/3438* (2013.01)

(58) Field of Classification Search
CPC .................. G06Q 10/0635; G01C 21/3438
USPC .......................................... 705/7.28
See application file for complete search history.

(56) References Cited

U.S. PATENT DOCUMENTS

| | | | |
|---|---|---|---|
| 7,119,696 B2 | 10/2006 | Borugian | |
| 7,769,499 B2 | 8/2010 | McQuade et al. | |
| 8,688,532 B2 | 4/2014 | Khunger et al. | |
| 9,615,213 B2 | 4/2017 | Tibbitts et al. | |
| 9,792,740 B2 | 10/2017 | Lambert et al. | |
| 10,112,529 B2 | 10/2018 | Gurunathan | |
| 10,209,085 B2 | 2/2019 | Chokshi et al. | |
| 10,231,091 B2 | 3/2019 | Fischer et al. | |
| 10,235,889 B2 | 3/2019 | Wei | |
| 10,275,959 B2 | 4/2019 | Ricci | |
| 2009/0216600 A1* | 8/2009 | Hill | G06Q 30/02 705/7.14 |

(Continued)

FOREIGN PATENT DOCUMENTS

| | | | |
|---|---|---|---|
| CN | 103942972 A | 7/2014 | |
| KR | 101489125 B1 | 2/2015 | |
| WO | WO-2019010437 A1 * | 1/2019 | ......... G01C 21/3438 |

OTHER PUBLICATIONS

CARCOs SafeRIDE Certified, an Ongoing Driver and Vehicle Monitoring Service, Ensures Safety and Compliance in the Rideshare Industry. Financial Services Monitor Worldwide [Amman] Jan. 9, 2018.*

(Continued)

*Primary Examiner* — Timothy Padot
(74) *Attorney, Agent, or Firm* — Snell & Wilmer LLP

(57) ABSTRACT

Methods, systems, and apparatus for a ride-sharing system. The ride-sharing system includes a ride-sharing platform. The ride-sharing platform includes a memory that is configured to store a driver profile and a processor that is coupled to the memory. The processor is configured to obtain a start location, a destination location and a rider profile. The processor is configured to determine a rider vulnerability score based on the rider profile and determine a route risk score based on the current location, the destination location and an expected route. The processor is configured to determine a driver risk score based on the driver profile. The processor is configured to generate a ride-share risk score based on the ride vulnerability score, the route risk score and the driver risk score and provide the ride-share risk score to a user device.

20 Claims, 5 Drawing Sheets

(56) References Cited

U.S. PATENT DOCUMENTS

| | | |
|---|---|---|
| 2012/0233246 A1 | 9/2012 | Guemez |
| 2017/0221149 A1* | 8/2017 | Hsu-Hoffman ......... G06Q 40/08 |
| 2017/0262659 A1* | 9/2017 | Kuris .................. G06F 21/6227 |
| 2018/0075380 A1* | 3/2018 | Perl ......................... G06Q 50/30 |
| 2018/0341261 A1* | 11/2018 | Kislovskiy ......... G01C 21/3438 |
| 2019/0019122 A1* | 1/2019 | Allen ..................... G06Q 50/30 |
| 2019/0130663 A1* | 5/2019 | Li ........................... G06V 20/59 |
| 2019/0287373 A1* | 9/2019 | Coq ..................... G08B 25/006 |

OTHER PUBLICATIONS

Ride-Sharing App Focused on Women's Safety Expands to DC. University Wire [Carlsbad] Aug. 31, 2018.*
Thomopoulos et al. Liason IP Location Based Services: Taxi on Demand, dated Feb. 2, 2006.

* cited by examiner

RIDE-SHARING SAFETY SYSTEM

BACKGROUND

Field

This disclosure relates to protecting passengers of ride-sharing vehicles from unsafe drivers.

Description of the Related Art

Ride-sharing has become a common form of transportation. Various ride-sharing companies offer ride-sharing services. The ride-sharing services rely on drivers using personal vehicles to transport riders from one location to another. These ride-sharing companies perform basic checks on the drivers who use their personal vehicles to transport the riders. These basic checks, however, are minimal and do not necessarily thoroughly vet the drivers. And unfortunately, occasionally, an unscrupulous driver gets through these basic checks and becomes a driver for these ride-sharing services. Even though these ride-sharing services may provide driver ratings for each driver, these driver ratings may not reflect the actual risk that the driver presents to a rider. Moreover, the actual risk of a driver may be different for different types of riders. For example, a rider who carries a weapon permit and/or knows self-defense is likely at risk from a driver than an underage child.

Accordingly, there is a need for a system and method for notifying or alerting a user when a ride-sharing trip presents an unacceptable risk.

SUMMARY

In general, one aspect of the subject matter described in this disclosure may be embodied in a ride-sharing platform. The ride-sharing platform includes a memory. The memory is configured to store a driver profile of a driver of a ride-sharing vehicle. The ride-sharing platform includes a processor. The processor is coupled to the memory. The processor is configured to obtain a start location, a destination location and a rider profile of a rider of the ride-sharing vehicle. The processor is configured to determine a rider vulnerability score based on the rider profile. The processor is configured to determine a route risk score based on the current location, the destination location and an expected route for the ride-sharing vehicle. The processor is configured to determine a driver risk score based on the driver profile. The processor is configured to generate a ride-share risk score based on the rider vulnerability score, the route risk score and the driver risk score. The processor is configured to provide the ride-share risk score to a user device.

These and other embodiments may optionally include one or more of the following features. The driver profile may include a first attribute of an amount of ride-sharing rides that the driver has completed. The driver profile may include a second attribute of a frequency of the ride-sharing rides that the driver has completed. The processor may be configured to determine the driver risk score further based on the first attribute of the amount of ride-sharing rides that the driver has completed and the second attribute of the frequency of the ride-sharing rides that the driver has completed.

The rider profile may include a first attribute that indicates a sex or gender of the rider and a second attribute that indicates an age of the rider. The processor may be configured to determine the rider vulnerability score based on the first attribute that indicates the sex or gender of the rider and the second attribute that indicates the age of the rider.

The processor may be configured to obtain a current location of the vehicle. The processor may be configured to determine the expected route based on the start location and the destination location. The processor may be configured to compare a current location of the vehicle with the expected route. The processor may be configured to determine that the current location of the vehicle deviates from the expected route based on the comparison. The processor may be configured to determine the route risk score based on the deviation. The processor may be configured to provide an alert including a confirmation request to a user device of the rider. The processor may be configured to obtain user input in response to the confirmation request. The processor may be configured to determine the route risk score further based on the user input.

The processor may be configured to obtain a route request that includes a number of riders and an identity of the rider. The processor may be configured to obtain the rider profile based on the identity of the rider. The processor may be configured to determine the rider vulnerability score further based on the number of riders.

In another aspect, the subject matter may be embodied in a ride-sharing platform. The ride-sharing platform includes a memory configured to store a driver profile of a driver. The ride-sharing platform includes a processor coupled to the memory. The processor is configured to obtain a start location, a current location and a destination location for a ride-sharing vehicle. The processor is configured to determine a rider vulnerability score. The processor is configured to determine an expected route based on the current location and the destination location. The processor is configured to obtain surrounding environment information of the ride-sharing vehicle based on the current location. The processor is configured to determine a route risk score based on the expected route and the surrounding environment information. The processor is configured to determine a driver risk score based on the driver profile. The processor is configured to generate a ride-share risk score based on the rider vulnerability score, the route risk score and the driver score. The processor is configured to provide the ride-share risk score.

In another aspect, the subject matter may be embodied in a method for alerting a rider of an unsecure ride-share trip. The method includes obtaining, by a processor of a ride-sharing platform, a start location, a destination location, a driver profile of a driver of a ride-sharing vehicle and a rider profile of the rider of the ride-sharing vehicle. The method includes determining, by the processor of the ride-sharing platform, a rider vulnerability score based on the rider profile. The method includes determining, by the processor of the ride-sharing platform, a route risk score based on the current location, the destination and an expected route for the ride-sharing vehicle. The method includes determining, by the processor of the ride-sharing platform, a driver risk score based on the driver profile. The method includes generating, by the processor of the ride-sharing platform, a ride-share risk score based on the rider vulnerability score, the route risk score and the driver score. The method includes providing, by the processor of the ride-sharing platform, the ride-share risk score to a user device based on the rider vulnerability score, the route risk score and the driver risk score.

BRIEF DESCRIPTION OF THE DRAWINGS

Other systems, methods, features, and advantages of the present invention will be apparent to one skilled in the art

DETAILED DESCRIPTION

Disclosed herein are systems, vehicles and methods for alerting the rider of an unsafe ride-sharing trip. Particular embodiments of the subject matter described in this disclosure may be implemented to realize one or more of the following advantages. The ride-sharing safety system ("ride-sharing system") monitors the surrounding environment of the vehicle, any deviations from the route and characteristics of the driver and the rider to determine whether the rider is any danger during the ride-sharing trip.

The ride-sharing system monitors data from multiple sources, collects data regarding the driver and/or rider, and analyzes any deviations regarding the route to determine whether the rider is in any danger before, during or after the ride-sharing trip. Once the ride-sharing system identifies or detects any irregularities or anomalies of the driver, the rider and/or the route, the ride-sharing system notifies a user and/or a service provider of the irregularities or the anomalies. This allows the rider to avoid entering the ride-sharing vehicle and/or to exit the ride-sharing vehicle before any danger occurs.

Other benefits and advantages include the capability to collect data of the surrounding environment of the vehicle and determine whether there is an external threat to the rider of the ride-sharing vehicle. Moreover, the ride-sharing alert system may determine whether the driver is acting suspiciously or has a suspicious past and determine whether there may be an internal threat to the driver of the ride-sharing vehicle. By assessing both internal and external threats, the ride-sharing alert system may determine an overall threat or danger that the ride-sharing trip presents to the rider and alert the rider of the overall threat in real-time.

Figure 1:
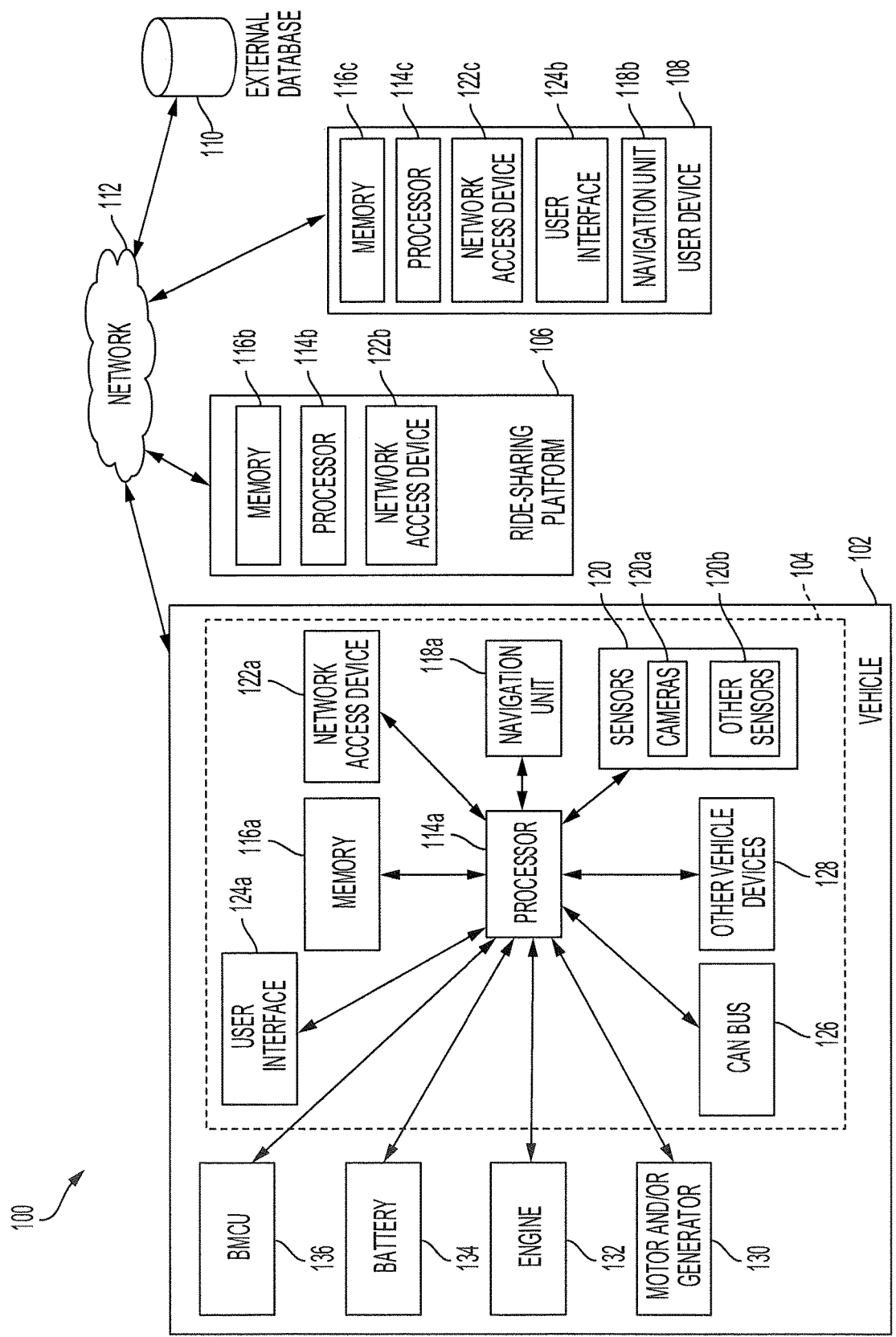
FIG. 1 is a block diagram of an example ride-sharing safety system according to an aspect of the invention.

FIG. 1 is a block diagram of a ride-sharing system 100. The ride-sharing system 100 may include a threat detection apparatus 104 and/or a ride-sharing platform 106. The ride-sharing platform 106 may be a separate platform coupled to the threat detection apparatus 104 and/or its functions may be included within the threat detection apparatus 104. The ride-sharing system 100 may be retro-fitted, coupled to, include or be included within a vehicle 102, such as a vehicle 102 used to ride-share (or "ride-share vehicle") or may be entirely separate and remote from the vehicle 102. The threat detection system 100 may couple, connect to, or include one or more user devices 108, such as a tablet, a laptop, a wearable device or other personal device, and/or an external database 110. The ride-sharing system 100 may have a network 112 that links the ride-sharing platform 106, the threat detection apparatus 104, the one or more user devices 108 and/or the external database 110. The network 112 may be a Dedicated Short-Range Communication (DSRC) network, a local area network (LAN), a wide area network (WAN), a cellular network, the Internet, or combination thereof, that connects, couples and/or otherwise communicates among the vehicle 102, the one or more user devices 108, the threat detection apparatus 104 and/or the ride-sharing platform 106.

The ride-sharing system 100 determines the risk to a passenger or a rider of a ride-sharing vehicle. The ride-sharing system 100 collects or analyzes data from multiple sources including controller area network (CAN) data from the CAN bus 126 of the vehicle 102, sensor data, driver profile and/or rider profiles and route information to assess the safety of the rider within the ride-sharing vehicle in real-time before, during and/or after the ride-sharing trip. The ride-sharing system 100 alerts the rider and/or another entity of any potential threats or unnecessary risks associated with the ride-sharing trip. Moreover, the ride-sharing system 100 may use artificial intelligence including a machine learning algorithm to identify and detect suspicious activity and/or situations before, during and/or after the ride-sharing trip.

The ride-sharing system 100 may include or be coupled to an external database 110. A database is any collection of pieces of information that is organized for search and retrieval, such as by a computer, and the database may be organized in tables, schemas, queries, reports, or any other data structures. A database may use any number of database management systems. The external database 110 may include a third-party server or a website that stores or provides information. The information may include real-time information, periodically updated information, or user-inputted information. A server may be a computer in a network that is used to provide services, such as accessing files or sharing peripherals, to other computers in the network.

The external database 110 may be a map database that has maps with various roadways along with structures, landmarks and/or places of interest along the various roadways. The maps may include information, such as the location of structures, landmarks and/or places of interest. Moreover, the information may also include information related to the criminal activity, e.g., crime rates or statistics, surrounding the roadways, the structures, landmarks and/or the places of interest.

The ride-sharing system 100 includes the threat detection apparatus 104, which utilizes components that already exist on the vehicle 102 to collect sensor data and/or CAN data to detect anomalies, such as risky driver behavior, and the ride-sharing platform 106. The ride-sharing platform 106, which performs the calculations and determination of any threats, works with the threat detection apparatus 104 to collect sensor data and/or CAN data that may indicate potential threats.

The threat detection apparatus 104 may include or be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle.

For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The threat detection apparatus 104 includes one or more processors 114a, such as an electronic control unit (ECU), and a memory 116a. The threat detection apparatus 104 may include or be coupled to other components, such as a navigation unit 118a, one or more sensors 120 or a network access device 122a, a user interface 124a, a controller area network (CAN) bus 126 and/or other vehicle devices 128. The threat detection apparatus 104 may couple, connect to, and/or include one or more vehicle components such as the motor and/or generator 130, the engine 132, the battery 134, and/or the battery management control unit (BMCU) 136. The threat detection apparatus 104 may not necessarily include the other components and/or the vehicle components, but rather, the threat detection apparatus 104 may be coupled to the other components and/or the vehicle components.

The one or more processors 114a may be implemented as a single processor or as multiple processors. The processor 114a may be electrically coupled to some or all the other components within the vehicle 102. The processor may include one or more controllers designed for collecting and analyzing data to identify, detect and/or determine risky activity, and in response, act to prevent, warn or otherwise mitigate consequences of the risky activity. The processor 114a may be coupled to a memory 116a and execute instructions that are stored in the memory 116a.

Similarly, the ride-sharing platform 106 and the user device 108 have one or more processors 114b-c, which may be implemented as a single processor or as multiple processors. The one or more processors 114b are designed to analyze the different variables, such as the driver risk, the passenger risk and/or the route risk to assess threats or risks to the rider of the ride-sharing vehicle 102. The one or more processors 114c are designed to present notifications to the rider and/or receive a ride-share request from the user and provide the ride-share request to the ride-sharing platform 106. The processor 114b may generate or obtain predictive baseline models ("baseline") and use machine learning algorithms to improve the assessment of the risk or anomalies before, during and/or after a ride-sharing trip, such as the assessment of the risk of a driver.

The threat detection apparatus 104, the ride-sharing platform 106 and/or the user device 108 may have a memory 116a-c, respectively. The memory 116a-c may be coupled to the processors 114a-c and store instructions that the processors 114a-c, respectively, executes. The memory 116a-c may store the CAN data received from the threat detection apparatus 104, the baseline model, sensor data, a driver and/or rider profile and other data that is used to determine the various risk scores associated with the ride-sharing trip.

The memory 116a-c may include one or more of a Random Access Memory (RAM), Read Only Memory (ROM) or other volatile or non-volatile memory. The memory 116a-c may be a non-transitory memory or a data storage device, such as a hard disk drive, a solid-state disk drive, a hybrid disk drive, or other appropriate data storage, and may further store machine-readable instructions, which may be loaded and executed by the processors 114a-c.

The threat detection apparatus 104 and/or the user device 108 may include a user interface 124a-b, respectively. The threat detection apparatus 104 and/or the user device 108 may receive user input via the user interface 124a-b, respectively. For example, the user interface 124a may receive user input, such as a login/password or other user credential, which identifies the driver of the vehicle 102. The login/password or other user credential may be provided to the ride-sharing platform 106, which may use the login/password or other user credential to obtain a driver profile. Similarly, in another example, the user interface 124b may receive a ride-share request, which includes an identity of the rider that requests that ride-share service. The ride-share request may be provided to the ride-sharing platform 106 to obtain a rider profile and determine an expected route of travel for the ride-share trip.

The user interface 124a-b may include an input/output device that receives user input from a user interface element, a button, a dial, a microphone, a keyboard, or a touch screen. The user interface 124a-b may provide an output to an output device, such as a display, a speaker, an audio and/or visual indicator, or a refreshable braille display.

The threat detection apparatus 104, the ride-sharing platform 106 and/or the user device 108 may have one or more network access devices 122a-c, respectively. The one or more network access devices 122a-c may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access devices 122a-c may transmit data to and receive data from the different components of the ride-sharing system 100 including the vehicle 102, the threat detection apparatus 104, the ride-sharing platform 106 and/or the user device 108. For example, the processor 114a may communicate with the ride-sharing platform 106 to provide sensor data and/or CAN data for analysis to determine suspicious behavior of the driver and/or to provide the identity of the driver, via the network 112 so that the ride-sharing platform 106 may obtain the driver profile.

The threat detection apparatus 104 and/or the user device 108 may include a navigation unit 118a-b, respectively. The navigation unit 118a may be integral to the vehicle 102 or a separate unit coupled to the vehicle 102, such as the navigation unit 118b within the user device 108. The vehicle 102 may include a Global Positioning System (GPS) unit (not shown) for detecting location data including a current location of the vehicle 102 and date/time information instead of the navigation unit 118a. In that regard, the processor 114a may perform the functions of the navigation unit 118a based on data received from the GPS unit. The navigation units 118a-b, or the processors 114a-c may perform navigation functions. Navigation functions may include, for example, route and route set prediction, providing navigation instructions, and receiving user input such as verification of predicted routes and route sets or destinations. Other information, such as a current speed of the vehicle 102 and/or a current direction of travel of the vehicle 102, may be extrapolated, interpreted or otherwise calculated from the data obtained from the one or more navigation units 118a-b.

The navigation unit 118a-b may provide and/or obtain navigational map information including location data, which may include a current location, a starting location, a destination location and/or a route between the starting location or current location and the destination location of the vehicle 102. The navigation unit 118*a*-*b* may include a memory (not shown) for storing the route data. The navigation unit 118*a*-*b* may receive data from other sensors capable of detecting data corresponding to location information. For example, the other sensors may include a gyroscope or an accelerometer.

The one or more sensors 120 may include a camera 120*a* or other sensors 120*b*. The other sensors 120*b* may include a vehicle speed sensor, a steering wheel sensor, a proximity sensor, a brake sensor and/or an acceleration sensor. Other examples of sensors may include a light detection and ranging (LIDAR) device and/or a radar device. The camera 120*a* may capture image data. For example, an internal camera may capture image data of suspicious driver activity, such as facial feature that may indicate that the driver is unexplainably nervous, and/or an external camera may capture image data of the surrounding environment in proximity to the vehicle 102, such as a dark alleyway, a lack of lighting or other uncharacteristically unwelcoming environment.

The one or more other sensors 120*b* may include a vehicle speed sensor. The vehicle speed sensor may measure the amount of rotation of the multiple wheels to determine anomalous changes in speed, such as excessive speeding or an uncharacteristic slowing of the vehicle 102. Other sensors 120*b* may include a steering wheel sensor, a proximity sensor, a brake sensor and/or an acceleration sensor. The steering wheel sensor may measure the amount and rate of change of the steering. The proximity sensor may measure a relative distance or detect objects within a threshold distance of the vehicle 102. The brake sensor may measure an amount of depression and/or a rate of depression of a brake pedal of the vehicle 102. The acceleration sensor may measure an amount of depression and/or a rate of depression of an accelerator pedal of the vehicle 102. For example, an unexpected slowing or stopping of the vehicle 102 in a remote dark neighborhood may indicate a foreseeable threat or danger.

Figure 2:
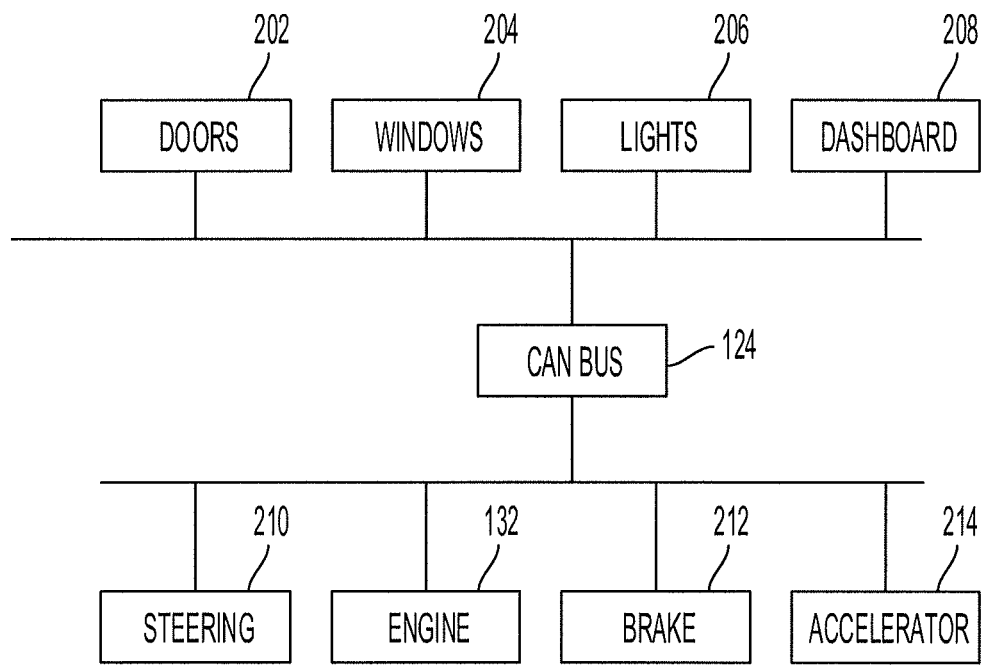
FIG. 2 is a block diagram of the controller area network (CAN) bus of the vehicle, which connects various devices that provide the CAN data according to an aspect of the invention.

The one or more sensors 116 may provide data along the controller area network (CAN) bus 126. The CAN bus 126 allows various microcontrollers, actuators, and/or the components of the vehicle 102 including other vehicle devices 128 to communicate with one another. FIG. 2 further describes the various other vehicle devices 128 that may be connected and/or provide data (or CAN data) along the CAN bus 126.

The ride-sharing system 100 may couple, connect to, and/or include one or more vehicle components. The one or more vehicle components may include a motor and/or generator 130. The motor and/or generator 130 may convert electrical energy into mechanical power, such as torque, and may convert mechanical power into electrical energy. The motor and/or generator 130 may be coupled to the battery 134. The motor and/or generator 130 may convert the energy from the battery 134 into mechanical power, and may provide energy back to the battery 134, for example, via regenerative braking. The vehicle 102 may include one or more additional power generation devices such as the engine 132 or a fuel cell stack (not shown). The engine 132 combusts fuel to provide power instead of and/or in addition to the power supplied by the motor and/or generator 130.

The battery 134 may be coupled to the motor and/or generator 130 and may provide electrical energy to and receive electrical energy from the motor and/or generator 130. The battery 134 may include one or more rechargeable batteries.

The BMCU 136 may be coupled to the battery 134 and may control and manage the charging and discharging of the battery 134. The BMCU 136, for example, may measure, using battery sensors, parameters used to determine the state of charge (SOC) of the battery 134. The BMCU 136 may control the battery 134.

FIG. 2 is a block diagram of the controller area network (CAN) bus 126 of the vehicle 102, which interconnects various devices that provide the CAN data. The CAN bus 124 couples the one or more vehicle components of the vehicle 102 including the one or more other vehicle devices 128. The one or more other vehicle devices 128 may include one or more doors 202, one or more windows 204, one or more lights 206 and/or dashboard 208. The one or more other vehicle devices 128 may also include the steering 210, the engine 132, the brake 212 and/or the accelerator 214. Each of the one or more vehicle devices 128 may be connected or coupled to a sensor, an electronic control unit or other controller or microcontroller, which communicates with the other sensors, other electronic control units or other controllers or microcontrollers.

For example, a controller or actuator connected to the one or more doors 202, the one or more windows 204, the one or more lights 206 and/or the dashboard 208 may send messages or commands to unlock or lock the one or more doors 202, turn on or off the one or more lights 206, open or close the one or more windows 204 and/or turn on, turn off or otherwise adjust indicators on the dashboard 208. In another example, one or more sensors connected to the steering 210, the engine 132, the brake 212 and/or the accelerator 214 may send messages or commands that control or indicate the angle of the steering 210, control or indicate the state of the engine 132, and/or control or indicate the rate or amount of brake depression of the brake 212 and/or the accelerator 214.

Figure 3:
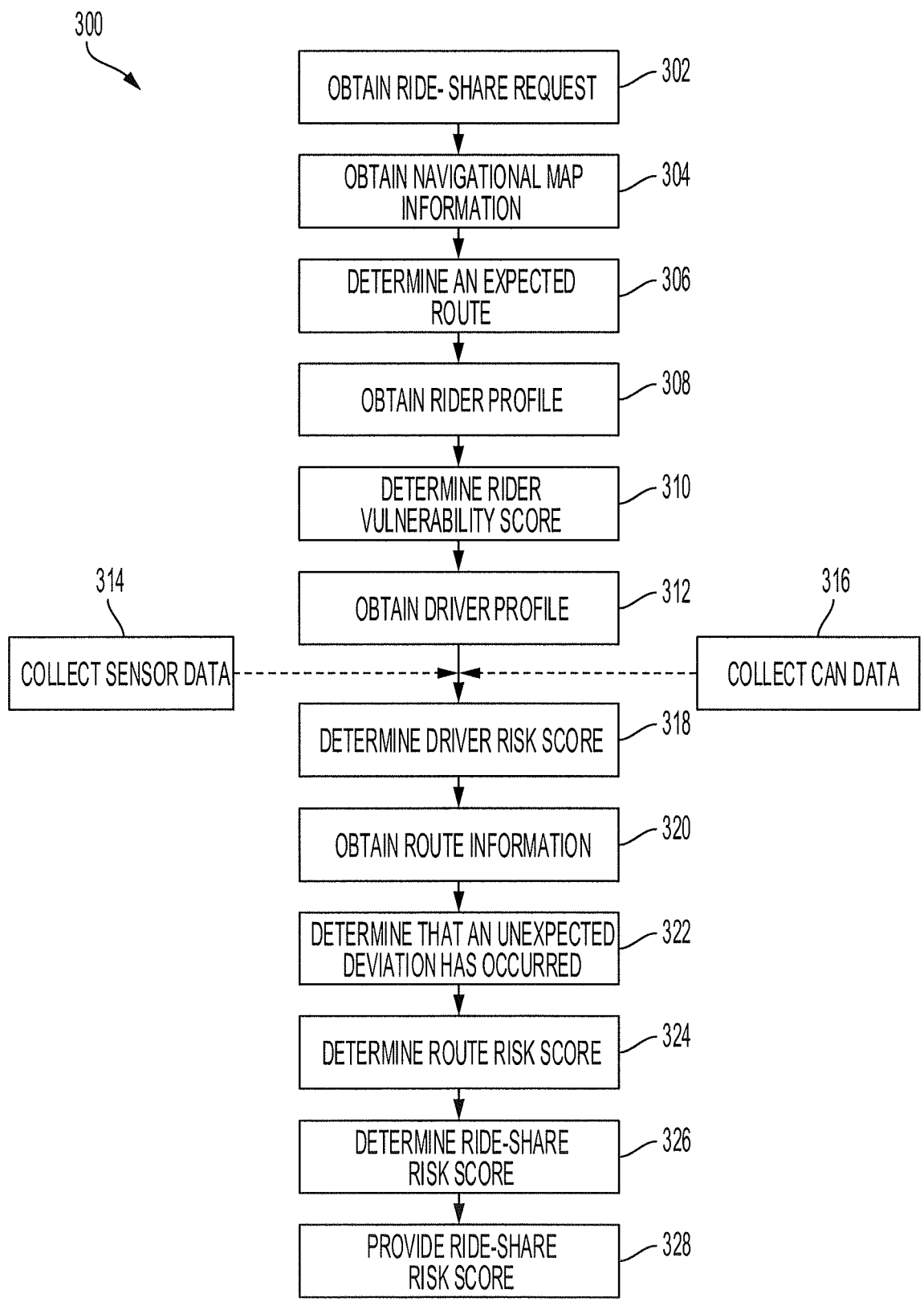
FIG. 3 is a flow diagram of an example process for assessing the safety of a ride-share trip using the ride-sharing platform of the ride-sharing safety system of FIG. 1 according to an aspect of the invention.

FIG. 3 is a flow diagram of a process 300 for assessing the overall safety of a ride-share trip. One or more computers or one or more data processing apparatuses, for example, the processor 114*b* of the ride-sharing platform 106 of the ride-sharing system 100 of FIG. 1, appropriately programmed, may implement the process 300.

The ride-sharing system 100 using the ride-sharing platform 106 obtains a ride-share request (302). The ride-sharing platform 106 may obtain the ride-share request from the user device 108. For example, the user may input information, such as a username, a pickup location, a number of riders and/or a destination location, into the user interface 124*b* and generate the ride-share request. The user device 108 may provide the ride-share request to the ride-sharing platform 106. The ride-sharing platform 106 obtains the ride-share request and extracts the username, the pickup location, the number of riders and/or the destination location from the ride-share request.

The ride-sharing platform 106 may obtain navigational map information (304). The navigational map information may include traffic and/or construction information. The navigational map information may include a current location of the vehicle 102 and/or a current time. The traffic and/or construction information may be used to determine an expected route. The current location of the vehicle 102 may be used to monitor the location of the vehicle 102 to ensure that the route of the vehicle 102 does not deviate.

The ride-sharing platform 106 determines an expected route (306). The ride-sharing platform 106 may determine the expected route based on the pickup location and the destination location from the ride-share request. The ride-sharing platform 106 may map the expected route and provide the expected route to the user device 108 that results in the least amount of travel time between the pickup location and the destination location. In some implementations, the ride-sharing platform 106 obtains navigational map information and determines the expected route based on the navigational map information. For example, the navigational map information may include traffic or construction that impedes or slows a route, and thus, the ride-sharing platform 106 may account for the traffic or construction when determining the least amount of travel time between the pickup location and the destination location for the expected route.

The ride-sharing platform 106 obtains the rider profile (308). The ride-sharing platform 106 may obtain the rider profile from the memory 116b and/or obtain the rider profile from an external database 110. The rider profile obtained may be based on the ride-share request. For example, the ride-sharing platform 106 may extract the username from the ride-share request and provide the username to the memory 116b and/or the external database 110, and in response, receive the rider profile associated with the username. The rider profile includes one or more attributes of the rider. The one or more attributes may include an identity and/or name of the rider, contact information, frequency or number of previous ride-share trips, an age, gender, height, size or other characteristics of the rider. The other characteristics may include skills, such as self-defense skills, a concealed weapon permit and/or other characteristics that affect the ability of the rider to protect themselves. These attributes may have been pre-configured or otherwise inputted when the rider completed the rider profile.

The ride-sharing platform 106 determines a rider vulnerability score (310). The rider vulnerability score reflects and/or relates to the vulnerability or susceptibility of the rider to an external threat, such as an unscrupulous driver or other threat, which may present a danger or physical threat to the rider. The rider vulnerability score may be based on the each of the one or more attributes or characteristics within the rider profile and/or information within the ride-share request, such as the number of riders. For example, as the number of riders that are accompanying the rider on the ride-share trip increases, the vulnerability score may decrease because the rider is safer travelling with more acquaintances. In another example, as the rider more frequently or more often uses the ride-share service for ride-share trips, the rider becomes more comfortable with ride-share trips and may be less vulnerable, and so, the rider vulnerability score may decrease. However, in another example, when the rider is underaged, undersized, elderly, female or does not have self-defense skills or a concealed weapon, the rider may be considered more vulnerable and the rider vulnerability score may increase.

Each of the one or more attributes or characteristics of the rider profile and/or the ride-share request may be weighted to determine the rider vulnerability score. The initial value of the rider vulnerability score may be set at a default value, and as each of the one or more attributes or characteristics are evaluated, the ride-sharing platform 106 may adjust the rider vulnerability score. The ride-sharing platform 106 may increase the rider vulnerability score when a characteristic or attribute makes the rider more vulnerable and decrease the rider vulnerability score when the characteristic of attributes makes the rider more secure.

The ride-sharing platform 106 obtains the driver profile of the driver of the ride-share vehicle 102 that is selected to transport the rider (312). The ride-sharing platform 106 selects the vehicle 102 that is to transport the rider based on the pickup location and the destination location. When the vehicle 102 is selected, the ride-sharing platform 106 identifies the driver of the vehicle 102 and obtains the driver profile of the driver. The ride-sharing platform 106 may obtain the driver profile from the memory 116b or the external database 110 in a similar manner that the rider profile was obtained.

The driver profile includes one or more attributes. The one or more attributes may include a frequency and/or a number of ride-sharing trips that the driver has completed, a driver rating, a general region or location of the completed ride-sharing trips, a criminal background check of the driver, other criminal or civil violations by the driver, a credit score of the driver and/or other characteristics of the driver. The other characteristics of the driver may include a gender, an age, a size or other physical characteristic of the driver.

The ride-sharing platform 106 may collect sensor data (314). The ride-sharing platform 108 may receive the sensor data from the threat detection apparatus 104 via the network 112. The sensor data may include external and/or internal image data from the one or more cameras 120a and other sensor data from the one or more other sensors 120b. The external and/or internal image data may include an indication of risky or suspicious driver activity or a suspicious figure or object in the surrounding environment of the vehicle 102. The other sensor data may indicate an unexpected braking or slowing of the vehicle 102 or an unexpected acceleration of the vehicle 102, such as when the vehicle 102 is approaching the destination location.

The ride-sharing platform 106 may collect CAN data from the CAN bus (316). The ride-sharing platform 106 may evaluate the multiple messages within the CAN data from the other vehicle devices 128, such as the doors 202, the windows 204, the lights 206, the steering 210, the engine 132, the brake 212 and/or the accelerator 214, to determine the states of the other vehicle devices 128. The various states of the other vehicle devices 128 may indicate driver behavior. For example, the messages may indicate that the driver is locking or unlocking the doors 202, opening or closing the windows 204 and/or the lights 206, and/or unexpectedly steering, braking or otherwise accelerating when the steering, braking or accelerating is not consistent with normal or baseline driving patterns, such as defined by a baseline model, which may be learned using machine algorithms.

The ride-sharing platform 106 generates or determines a driver risk score (318). The driver risk score reflects and/or relates to the risk or threat of the driver to a potential rider. The driver risk score may be based on each of the one or more attributes or characteristics within the driver profile. For example, if the one or more attributes indicate that the driver has a criminal history and/or background, the driver may then present a larger risk to any riders or passengers. And so, the driver risk score may increase because the driver has a criminal background. In another example, when the driver is a large adult male, the driver may present more of a threat to an underaged child, and so, the driver risk score may increase because of the characteristics of the driver.

Each of the one or more attributes or characteristics of the driver profile may be weighted to determine the driver risk score. The initial value of the driver risk score may be set at a default value, and as each of the one or more attributes or characteristics are evaluated, the ride-sharing platform 106 may adjust the driver risk score. The ride-sharing platform 106 may increase the driver risk score when a characteristic or attribute makes the driver more of a threat and decrease the driver risk score when the characteristic of attributes makes the driver less of a threat.

The driver risk score may also be based on the CAN data, the sensor data and/or the current location of the vehicle 102.

For example, if the sensor data, such as image data, captures drive behavior that is suspicious, the ride-sharing platform 106 may incorporate the suspicious behavior when determining the driver risk score. In another example, if the CAN data and/or the sensor data indicates that the driver is unnecessarily slowing the vehicle 102, such as applying the brakes 212 on an unimpeded roadway in a secluded area, opening the windows 204 and/or unlocking the doors 202 in the secluded area or otherwise performing suspicious activities, the ride-sharing platform 106 may increase the driver risk score because the driver is behaving abnormally. In another example, the camera 120a may capture image data and recognize that another passenger that is not part of the ride-share trip or any ride-share trip is in the vehicle 102, which may cause the ride-sharing platform 106 to raise the driver risk score because the driver is picking up unregistered or unaccounted for passengers.

The ride-sharing platform 106 obtains route information (320). The route information includes a degree of criminal activity along the expected route and/or other variables along the expected route. The degree of criminal activity will affect the safety of the vehicle 102 as the vehicle 102 traverses along the expected route. For example, travel through high crime areas present more of a risk than travel through low crime areas. The other variable may include the density of the population or traffic along the expected route. For example, areas of the expected route that are secluded may present more of a threat to the rider than areas that are highly populated because the seclusion provides the driver the opportunity to perform suspicious activity and/or there may be external threats to the vehicle 102.

Figure 4:
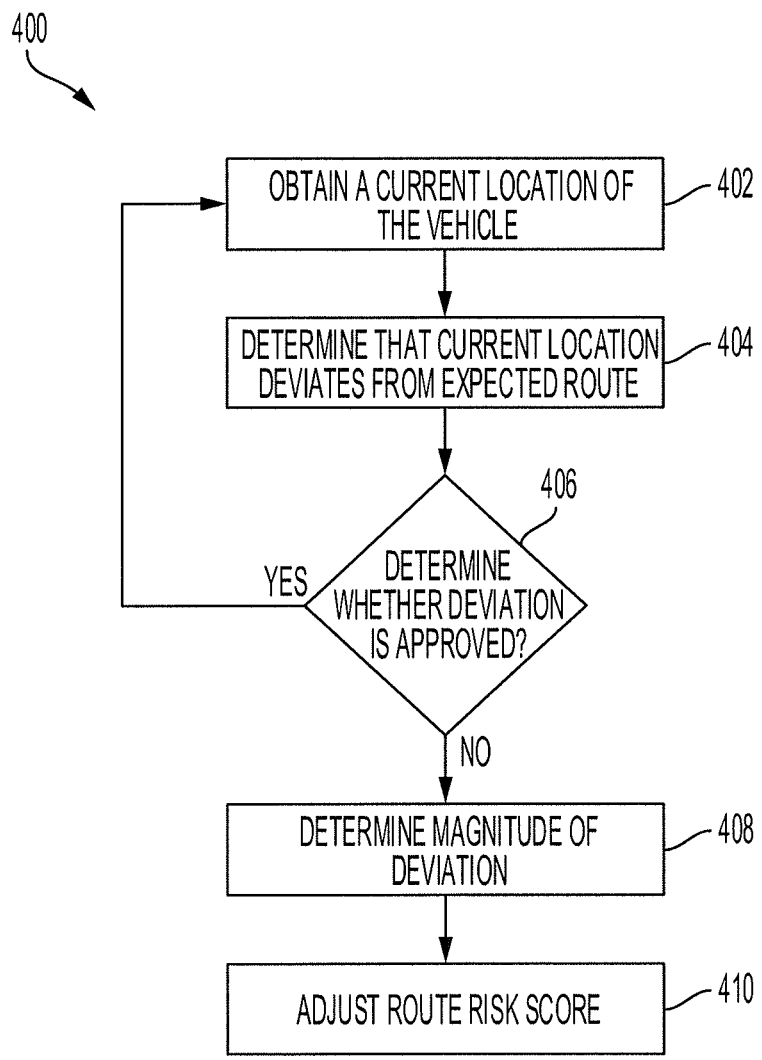
FIG. 4 is a flow diagram of an example process for determining the route risk score using the ride-sharing platform of the ride-sharing safety system of FIG. 1 according to an aspect of the invention.

The ride-sharing platform 106 may determine that an unexpected deviation of the expected route has occurred (322). FIG. 4 describes the process 400 for determining whether the vehicle 102 has unexpectedly deviated from the expected route.

The ride-sharing platform 106 determines a route risk score (324). The route risk score reflects and/or relates to the risks or threats while the vehicle 102 traverses the expected route. The route risk score may be based on any unexpected deviations from the expected route and/or the route information of the expected route. For example, if the vehicle 102 deviates from the expected route and traverses roadways that are not included in the expected route, this may indicate the vehicle 102 is headed toward an unintended destination and to a location where rider does not intend to go. And so, the route risk score may increase because the vehicle 102 is traversing an unknown route. In another example, when the route information for the expected route indicates that the expected route traverses through a neighborhood with significant criminal activity, this may present an additional danger or risk to the rider, and so, the route risk score may increase to reflect the additional danger or risk of the criminal activity.

The initial value of the route risk score may be set at a default value, and any deviations and/or the route information may cause the ride-sharing platform 106 to adjust the route risk score. The ride-sharing platform 106 may increase the route risk score when the vehicle 102 deviates farther from the expected route or travels through an area with high criminal activity and decreasing when the vehicle 102 travels the expected route and/or through safe neighborhoods.

The ride-share platform 106 determines a ride-share risk score (326). The ride-share risk score may be weighted combination of the route risk score, the driver risk score and/or the rider vulnerability score. The ride-share risk score reflects and/or relates to the overall risk the rider is exposed to when riding with the driver of the vehicle 102 for the ride-share trip. The ride-share risk score may be updated in real-time throughout the ride-share trip as it may reflect apparent and actual risks during the travel of the ride-share trip. In some implementations, one of the scores, such as the driver risk score, may be weighted more heavily than another score, such as the rider vulnerability score. For example, when the driver is a new driver, the ride-share platform 106 may weight the driver risk score more heavily than the route risk score when the route only slightly deviates from the expected route. The weights may be user-configured and/or pre-configured.

Figure 5:
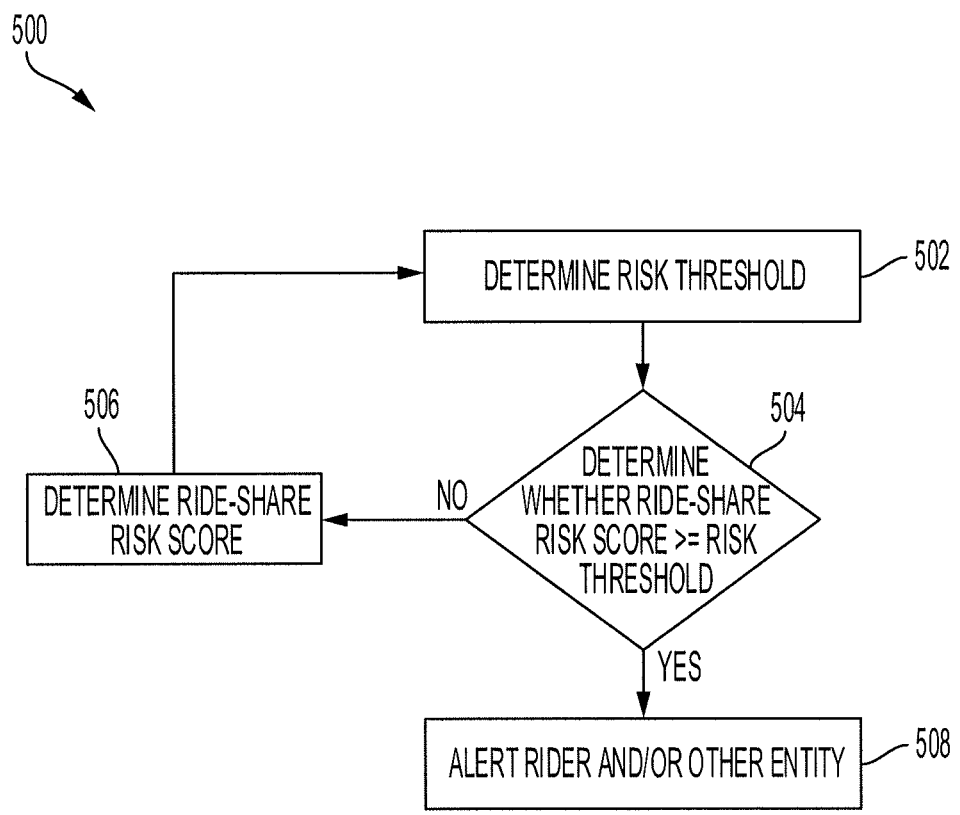
FIG. 5 is a flow diagram of an example process for alerting the user or other entity of a ride-sharing risk using the ride-sharing platform of the ride-sharing safety system of FIG. 1 according to an aspect of the invention.

Once the ride-share risk score is determined, the ride-sharing platform 106 may provide the ride-share risk score to the user device 108 to display the ride-share risk score (328). The ride-share risk score may continuously be displayed so that the rider is aware of their risk throughout the entire ride-share trip. The ride-share risk score may be displayed on the user device 108. In some implementations, the ride-sharing platform 106 may provide the ride-share risk score to another device of the ride-share service provider to allow the ride-share service to monitor the ride-share trip. FIG. 5 further describes the process 500 of alerting the rider and/or other entity.

FIG. 4 is a flow diagram of a process for determining the route risk score. One or more computers or one or more data processing apparatuses, for example, the processor 114b of the ride-sharing platform 106 of the ride-sharing system 100 of FIG. 1, appropriately programmed, may implement the process 400.

The ride-sharing platform 106 obtains or determines the current location of the vehicle 102 (402). The ride-sharing platform 106 may extract the current location from the navigational map information, which may have been obtained via one of the navigation units 118a-b of the vehicle 102 or the user device 108, respectively, during the ride-sharing trip.

The ride-sharing platform 106 determines that the current location deviates from the expected route (404). The ride-sharing platform may compare the current location to a closest point on the expected route and measures the relative distance between the current location and the closest point. If the current location is a threshold distance away from the closest point on the expected route, such as approximately 500 feet, the ride-sharing platform 106 may determine that the vehicle 102 has deviated from the expected route.

When the ride-sharing platform 106 has determined that the vehicle 102 has deviated from the expected route, the ride-sharing platform 108 may determine whether the deviation is approved (406). The ride-sharing platform 106 provide a confirmation request that indicates that the vehicle 102 has deviated from the expected route to the user via the user device 108. The confirmation request may request that the user confirm that the deviation is approved. The user device 108 may provide and the ride-sharing platform 106 may receive user input that indicates whether the route deviation is approved or not. If the user input indicates that the route deviation is approved, the ride-sharing platform 106 may continue monitoring the current location of the vehicle 102 and adjust the expected route. For example, when a user requests a deviation of the route to pick-up food or to make an additional stop, the ride-sharing platform 106 does not adjust the route risk score because of the deviation. If the user input indicates that the route deviation is not approved, the ride-sharing platform 106 may determine the magnitude of the deviation. For example, when the driver takes an alternative dirt road away from the main road of the expected path, this may present an additional risk to the rider, and so, the ride-sharing platform 106 may increase or otherwise adjust the route risk score because of the deviation.

When the route deviation is not approved, the ride-sharing platform 106 determines the magnitude of the deviation (408). The magnitude of the deviation may be based on the relative distance between the current location and the closest point on the expected route. For example, when the deviation is 15 miles rather than 1 mile, the deviation is greater, and so, the ride-sharing platform 106 may account for the greater deviation. Moreover, the magnitude of the deviation may factor in the safety and/or any threats in the surrounding areas of the deviation. For example, when the deviation routes the vehicle 102 to a secluded area, the magnitude may be greater than when the deviation routes the vehicle to a densely populated area because a secluded area may present more of a threat or danger to the rider than a densely populated area.

The ride-sharing platform 106 adjusts the route risk score based on the magnitude of the deviation (410). As the magnitude of the deviation increases or becomes greater, the ride-sharing platform 106 increases the route risk score to reflect the greater risk. As the magnitude of the deviation decreases or becomes lesser, the ride-sharing platform 106 decreases the route risk to score to reflect the lesser risk.

FIG. 5 is a flow diagram of a process for alerting the user or other entity, such as a ride-sharing service provider, of a ride-sharing risk. One or more computers or one or more data processing apparatuses, for example, the processor 114b of the ride-sharing platform 106 of the ride-sharing system 100 of FIG. 1, appropriately programmed, may implement the process 500.

Once the ride-sharing risk score is determined, the ride-sharing platform 106 determines a risk threshold (502). The risk-threshold may be based on a baseline model. The ride-sharing platform 106 may obtain the baseline model from an external database 110. The baseline model may have been generated using artificial intelligence, such as a machine algorithm. The baseline model may be formed from data collected from multiple sources, such as from multiple riders having multiple user devices 106, who have ridden in one of multiple ride-sharing vehicles over multiple ride-sharing trips. The baseline model provides a threshold at which there is a danger or risk to the rider and may be updated as more information is collected from various ride-sharing trips. The baseline model may be specific to a location of the ride-sharing trip and/or a type of rider, such as an elderly person, a female or other attribute of the rider. A machine learning algorithm may be used to analyze the data collected from the multiple sources to determine the baseline model where a threat or risk is posed to a rider of a ride-sharing vehicle. The multiple sources may include multiple ride-sharing trips across multiple drivers and/or riders.

The ride-sharing platform 106 determines whether the ride-share risk score is greater than or equal to the risk threshold (504). When the ride-share risk score is less than the risk threshold, the ride-sharing platform 106 continues to monitor and calculate the ride-share risk score and the risk threshold (506). When the ride-share risk score is greater than or equal to the risk threshold, the ride-sharing platform 106 may alert the user or rider via the user device 108 and/or another entity, such as the ride-sharing service provider.

The ride-sharing platform 106 alerts the rider and/or the other entity by sending an indicator to the rider and/or the other entity (508). The indicator may be a notification that includes information regarding the ride-share risk score, the driver of the vehicle 102 and/or the rider. Moreover, the information may include a current location of the vehicle 102 so that the information may be provided to the police or other government agency if there is a danger to the rider. The notification may require the rider to confirm that the rider is safe, and if the rider does not confirm that the rider is safe, the ride-sharing platform 106 may alert the other entity, such as police or the ride-sharing service provider, that the rider may be in danger. The notification may be sent to other infrastructure devices to capture events at the current location of the vehicle 102 and the rider to capture and document any instance of a threat to the rider.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A ride-sharing system, comprising:
   at least one of a door, a window, steering, an engine, a brake, or an accelerator on or within a ride-sharing vehicle that is configured to provide controller area network (CAN) data onto a CAN bus on the ride-sharing vehicle; and
   a ride-sharing platform including:
      a memory configured to store a driver profile of a driver;
      one or more sensors configured to detect sensor data including image data relating to one or more riders within the ride-sharing vehicle; and
      a processor coupled to the memory and the one or more sensors and configured to:
         obtain a start location, a destination location, and a rider profile of a rider within the ride-sharing vehicle,
         determine a rider vulnerability score based on the rider profile,
         determine a route risk score based on the start location, the destination location, and an expected route for the ride-sharing vehicle,
         collect the CAN data from the CAN bus on the ride-sharing vehicle,
         determine a driver risk score based on the CAN data and the image data indicating an unexpected or unplanned presence of one or more second riders within the ride-sharing vehicle,
         generate a ride-share risk score based on the rider vulnerability score, the route risk score, and the driver risk score, and
         provide the ride-share risk score to a user device.

2. The ride-sharing system of claim 1, wherein the driver profile includes a first indicator of an amount of ride-sharing rides that the driver has completed and a second indicator of a frequency of the ride-sharing rides that the driver has completed.

3. The ride-sharing system of claim 2, wherein the processor is further configured to determine the driver risk score based on the driver profile including the first indicator of the amount of the ride-sharing rides that the driver has completed and the second indicator of the frequency of the ride-sharing rides that the driver has completed.

4. The ride-sharing system of claim 1, wherein the rider profile includes a first indicator that indicates a sex or gender of the rider and a second indicator that indicates an age of the rider, wherein the processor is further configured to determine the rider vulnerability score based on the first indicator that indicates the sex or gender of the rider and the second indicator that indicates the age of the rider, and wherein the rider vulnerability score increases when the rider is underaged, elderly or female.

5. The ride-sharing system of claim 1, wherein the processor is further configured to:
obtain a current location of the ride-sharing vehicle;
determine the expected route based on the start location and the destination location;
compare the current location of the ride-sharing vehicle with the expected route;
determine, based on the comparison, that the current location of the ride-sharing vehicle deviates from the expected route; and
determine the route risk score based on the deviation.

6. The ride-sharing system of claim 5, wherein the processor is further configured to:
provide an alert including a confirmation request to a user device of the rider;
obtain user input in response to the confirmation request; and
determine the route risk score further based on the user input.

7. The ride-sharing system of claim 1, wherein the processor is further configured to:
obtain a route request that includes a number of riders and an identity of the rider;
obtain the rider profile based on the identity of the rider; and
determine the rider vulnerability score further based on the number of riders.

8. A method for alerting a rider of a suspicious driver, comprising:
providing, by at least one of a door, a window, steering, an engine, a brake, or an accelerator on or within a ride-sharing vehicle, controller area network (CAN) data onto a CAN bus on the ride-sharing vehicle;
obtaining, by a processor of a ride-sharing platform, a start location, a destination location, a driver profile of a driver within the ride-sharing vehicle, and a rider profile of a rider within the ride-sharing vehicle;
determining, by the processor, a rider vulnerability score based on the rider profile;
determining, by the processor, a route risk score based on the start location, the destination location, and an expected route for the ride-sharing vehicle;
collecting, by the processor, the CAN data from the CAN bus on the ride-sharing vehicle;
obtaining, by the processor and from one or more sensors, sensor data including image data relating to one or more riders within the ride-sharing vehicle;
determining, by the processor, a driver risk score based on the driver profile, the CAN data, and the image data indicating an unexpected or unplanned presence of one or more second riders within the ride-sharing vehicle;
generating, by the processor, a ride-share risk score that indicates an overall risk the rider is exposed to when riding with the driver within the ride-sharing vehicle, the ride-share risk score being based on the rider vulnerability score, the route risk score, and the driver risk score; and
providing, by the processor, the ride-share risk score to a user device.

9. The method of claim 8, wherein the driver profile includes a first indicator of an amount of ride-sharing rides that the driver has completed and a second indicator of a frequency of the ride-sharing rides that the driver has completed.

10. The method of claim 9, wherein determining the driver risk score is further based on the first indicator of the amount of the ride-sharing rides that the driver has completed and the second indicator of the frequency of the ride-sharing rides that the driver has completed.

11. The method of claim 8, further comprising:
providing an alert including a confirmation request to the user device.

12. The method of claim 11, wherein:
the alert includes a notification including information related to at least one of the ride-share risk score, the driver, or the rider; and
the confirmation request includes a request for the rider to confirm that the rider is safe.

13. The method of claim 12, further comprising:
transmitting a second alert to a government agency in response to not receiving the confirmation that the rider is safe within a predetermined period of time.

14. A ride-sharing system of a ride-sharing vehicle, comprising:
one or more vehicle components each configured to provide controller area network (CAN) data via a CAN bus;
a memory configured to store a driver profile of a driver;
one or more sensors configured to detect sensor data including image data relating to one or more riders within the ride-sharing vehicle; and
a processor coupled to the memory, the CAN bus, and the one or more sensors and configured to:
obtain a start location, a destination location, and a rider profile of a rider within the ride-sharing vehicle,
determine a rider vulnerability score based on the rider profile,
determine a route risk score based on the start location, the destination location, and an expected route for the ride-sharing vehicle,
collect the CAN data from the CAN bus,
determine a driver risk score based on the CAN data and the image data indicating an unexpected or unplanned presence of one or more second riders within the ride-sharing vehicle,
generate a ride-share risk score based on the rider vulnerability score, the route risk score, and the driver risk score, and
provide the ride-share risk score to a user device.

15. The ride-sharing system of claim 14, wherein the driver profile includes a first indicator of an amount of ride-sharing rides that the driver has completed and a second indicator of a frequency of the ride-sharing rides that the driver has completed.

16. The ride-sharing system of claim 15, wherein the processor is further configured to determine the driver risk score based on the driver profile including the first indicator of the amount of the ride-sharing rides that the driver has completed and the second indicator of the frequency of the ride-sharing rides that the driver has completed.

17. The ride-sharing system of claim 14, wherein the rider profile includes a first indicator that indicates a sex or gender of the rider and a second indicator that indicates an age of the rider, wherein the processor is further configured to determine the rider vulnerability score based on the first indicator that indicates the sex or gender of the rider and the second indicator that indicates the age of the rider, and wherein the rider vulnerability score is configured to be increased when the rider is under a first threshold age, over a second threshold age, or female.

18. The ride-sharing system of claim 14, wherein the processor is further configured to:
  obtain a current location of the ride-sharing vehicle;
  determine the expected route based on the start location and the destination location;
  compare the current location of the ride-sharing vehicle with the expected route;
  determine, based on the comparison, that the current location of the ride-sharing vehicle deviates from the expected route; and
  determine the route risk score further based on the deviation.

19. The ride-sharing system of claim 18, wherein the processor is further configured to:
  provide an alert including a confirmation request to a user device of the rider;
  obtain user input in response to the confirmation request; and
  determine the route risk score further based on the user input.

20. The ride-sharing system of claim 19, wherein the processor is further configured to:
  obtain a route request that includes a number of riders and an identity of the rider;
  obtain the rider profile based on the identity of the rider; and
  determine the rider vulnerability score further based on the number of riders.

\* \* \* \* \*